United States Patent
Kouda et al.

(10) Patent No.: US 12,434,463 B2
(45) Date of Patent: Oct. 7, 2025

(54) STRETCHED POLYETHYLENE FILM FOR LAMINATION

(71) Applicant: TOSOH CORPORATION, Yamaguchi (JP)

(72) Inventors: Shingo Kouda, Yokkaichi (JP); Shoji Nishio, Yokkaichi (JP); Kenichi Suzuki, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 186 days.

(21) Appl. No.: 18/281,806

(22) PCT Filed: Feb. 18, 2022

(86) PCT No.: PCT/JP2022/006534
§ 371 (c)(1),
(2) Date: Sep. 13, 2023

(87) PCT Pub. No.: WO2022/196239
PCT Pub. Date: Sep. 22, 2022

(65) Prior Publication Data
US 2024/0308195 A1    Sep. 19, 2024

(30) Foreign Application Priority Data
Mar. 16, 2021   (JP) .................................. 2021-042232

(51) Int. Cl.
| | | |
|---|---|---|
| B32B 27/32 | (2006.01) |
| B32B 7/02 | (2019.01) |
| B32B 27/08 | (2006.01) |
| C08F 10/02 | (2006.01) |
| C08J 5/18 | (2006.01) |
| C08L 23/06 | (2006.01) |
| C08L 23/0807 | (2025.01) |

(52) U.S. Cl.
CPC ............... B32B 27/32 (2013.01); B32B 7/02 (2013.01); B32B 27/08 (2013.01); C08F 10/02 (2013.01); C08J 5/18 (2013.01); C08L 23/06 (2013.01); C08L 23/0815 (2013.01); B32B 2250/02 (2013.01); B32B 2250/242 (2013.01); B32B 2272/00 (2013.01); B32B 2307/518 (2013.01); B32B 2307/72 (2013.01); C08J 2323/06 (2013.01); C08J 2423/08 (2013.01)

(58) Field of Classification Search
CPC ....... B32B 27/32; B32B 27/327; C08F 10/00; C08F 10/02; C08F 110/00; C08F 110/02; C08F 210/00; C08F 210/02; C08L 23/00; C08L 23/02; C08L 23/04; C08L 23/06; C08L 23/08; C08L 23/0807; C08L 23/0815
See application file for complete search history.

(56) References Cited

U.S. PATENT DOCUMENTS

| | | | |
|---|---|---|---|
| 7,544,422 B2 | 6/2009 | Yamaguchi | |
| 10,792,899 B2 | 10/2020 | Pan et al. | |
| 2006/0024519 A1 | 2/2006 | Yamaguchi | |
| 2019/0210333 A1 | 7/2019 | Pan et al. | |
| 2020/0017670 A1 | 1/2020 | Wang et al. | |
| 2024/0424768 A1* | 12/2024 | Alaboson | ................ B32B 27/30 |

FOREIGN PATENT DOCUMENTS

| | | |
|---|---|---|
| JP | 61-33951 A | 2/1986 |
| JP | 06-262679 A | 9/1994 |
| JP | 2005-104525 A | 4/2005 |
| JP | 2006-043911 A | 2/2006 |
| JP | 2006-152091 A | 6/2006 |
| JP | 2009-233904 A | 10/2009 |
| JP | 2019-171860 A | 10/2019 |
| JP | 2019-529165 A | 10/2019 |

OTHER PUBLICATIONS

International Preliminary Report on Patentability issued Sep. 12, 2023 in Application No. PCT/JP2022/006534, including translation of Written Opinion previously filed.
International Search Report for PCT/JP2022/006534 dated Apr. 26, 2022 [PCT/ISA/210].
Written Opinion for PCT/JP2022/006534 dated Apr. 26, 2022 [PCT/ISA/237].

* cited by examiner

*Primary Examiner* — Zachary M Davis
(74) *Attorney, Agent, or Firm* — Sughrue Mion, PLLC

(57) ABSTRACT

A stretched polyethylene film for lamination, which comprises a polyethylene (A) having a weight average molecular weight (Mw) as measured by gel permeation chromatography of from 70,000 to 250,000, a proportion of fractions with a molecular weight of 10,000 or less of 8 wt % or less, and a density as measured in accordance with JIS K6922-1 (1997) of from 945 to 980 kg/m³, and has at least one peak in a range of 135° C. or higher in an endothermic curve as measured by differential scanning calorimetry, the film having high recyclability and excellent in heat resistance.

7 Claims, No Drawings

STRETCHED POLYETHYLENE FILM FOR LAMINATION

CROSS REFERENCE TO RELATED APPLICATIONS

This application is a National Stage of International Application No. PCT/JP2022/006534 filed Feb. 18, 2022, claiming priority based on Japanese Patent Application No. 2021-042232 filed Mar. 16, 2021, the entire disclosures of which are incorporated by reference herein.

TECHNICAL FIELD

The present invention relates to a stretched polyethylene film for lamination.

BACKGROUND ART

A polyethylene film has appropriate flexibility, is excellent in transparency, moisture resistance, chemical resistance, etc., and is inexpensive, and is thereby used for packaging material.

However, a polyethylene film has low rigidity, impact resistance, heat resistance, etc., and may not be used alone for some applications. To overcome such a problem, a laminated film having a polyethylene film and other resin film (for example, a polypropylene film, a polyester film or a polyamide film) laminated is widely used as a packaging material (for example Patent Document 1).

On the other hand, in recent years, waste plastic disposal has attracted attention as a social problem, and with a growing demand for building recycling society, improvement in recyclability of packaging materials has been required. The above packaging material having films of different materials combined, is hardly subjected to recycle such as material recycle or chemical recycle, and thus as a packaging material composed of resin materials of the same type, a packaging material having a stretched polyethylene film and a non-stretched polyethylene film laminated has been proposed (for example Patent Documents 2, 3). The stretched polyethylene film is used to compensate for mechanical properties of the non-stretched polyethylene film and to suppress adhesion of the resin to a seal bar at the time of heat sealing. However, even the stretched polyethylene film does not have mechanical properties so high as those of a biaxially stretched polyamide film or a biaxially stretched polyester film, and since shrinkage particularly at the heat-sealed portion is significant, the heat-sealing temperature has to be lowered, whereby the heat sealing strength may be insufficient.

Further, as a polyethylene film excellent in rigidity, heat resistance and strength, an ultrahigh molecular weight polyethylene film has been proposed (for example Patent Document 4) However, an ultrahigh molecular weight polyethylene film is inferior in melt-miscibility with a common polyethylene and when subjected to material recycle, non-uniformity in dispersion and non-uniformity in melting may occur, whereby the quality of recycled resins is remarkably impaired.

PRIOR ART DOCUMENTS

Patent Documents

Patent Document 1: JP-A-2005-104525
Patent Document 2: JP-A-2019-171860
Patent Document 3: JP-A-2019-529165
Patent Document 4: JP-A-1994-262679

DISCLOSURE OF INVENTION

Technical Problem

The present invention has been made to solve the above problems, and the object of the present invention is to provide a stretched polyethylene film for lamination which has high recyclability and is excellent in heat resistance.

Solution to Problem

The present inventors have conducted extensive studies to achieve the above object and as a result, found that a specific stretched polyethylene film has excellent recyclability and heat resistance, and accomplished the present invention.

That is, the present invention relates to a stretched polyethylene film for lamination, which comprises a polyethylene (A) having a weight average molecular weight (Mw) as measured by gel permeation chromatography of from 70,000 to 250,000, a proportion of fractions with a molecular weight of 10,000 or less of 5 wt % or less, and a density as measured in accordance with JIS K6922-1 (1997) of from 945 to 980 kg/m³, and has at least one peak in a range of 135° C. or higher in an endothermic curve as measured by a differential scanning calorimetry.

The present invention further relates to a laminated film comprising the stretched polyethylene film for lamination, and an ethylene polymer film having a density of from 880 to 940 kg/m3 disposed on at least one side of the stretched polyethylene film.

The present invention further relates to a method for producing a biaxially stretched film, which comprises stretching the stretched polyethylene film for lamination further in the transverse direction.

The present invention still further relates to recycled polyethylene pellets constituted by the film having the stretched polyethylene film for lamination.

That is, the present invention provides the following [1] to [6].

[1] A stretched polyethylene film for lamination, which comprises a polyethylene (A) having a weight average molecular weight (Mw) as measured by gel permeation chromatography of from 70,000 to 250,000, a proportion of fractions with a molecular weight of 10,000 or less of 8 wt % or less, and a density as measured in accordance with JIS K6922-1 (1997) of from 945 to 980 kg/m3, and has at least one peak in a range of 135° C. or higher in an endothermic curve as measured by a differential scanning calorimetry.

[2] The polyethylene film for lamination according to the above [1], wherein the polyethylene (A) contains from 5 to 100 ppm of an organic peroxide or a decomposed product thereof.

[3] The stretched polyethylene film for lamination according to the above [1] or [2], which is formed of a polyethylene composition comprising from 90 to 99.99 wt % of the polyethylene (A) and from 0.01 to 10 wt % of an ethylene/α-olefin copolymer (B) of which a fraction with Mn of 100,000 or more obtained by molecular weight fractionation has 0.15 or more long chain branches per 1,000 carbon atoms of the main chain.

A laminated film comprising the stretched polyethylene film for lamination as defined in any one of the above [1] to [3], and an ethylene polymer film having a density of from 880 to 940 kg/m$^3$ disposed on at least one side of the stretched polyethylene film for lamination.

A method for producing a biaxially stretched film, which comprises stretching the stretched polyethylene film for lamination as defined in any one of the above [1] to [3], further in the transverse direction.

Recycled polyethylene pellets constituted by the stretched polyethylene film for lamination as defined in any one of the above [1] to [3] or the laminated film as defined in the above [4].

Advantageous Effects of Invention

The stretched polyethylene film for lamination of the present invention has high heat resistance and is useful as a substrate for a packaging laminated film for food, beverage and pharmaceutical products. Further, a laminated film the most part of which is constituted by a polyethylene material is obtained, thus leading to excellent recyclability and reduction in environmental burden.

DESCRIPTION OF EMBODIMENTS

Now, the stretched polyethylene film for lamination according to an embodiment of the present invention will be described in detail.

The polyethylene (A) of the present invention has a weight average molecular weight (Mw) as measured by gel permeation chromatography of from 70,000 to 250,000, preferably from 100,000 to 200,000, more preferably from 100,000 to 150,000. If Mw is less than 70,000, the strength of the stretched film for lamination tends to be low, and the sealing strength of the obtained laminated film tends to be insufficient. If Mw is higher than 250,000, the melt extrusion property tends to be poor in material recycle, and the performance of the obtained recycled resin tends to be deteriorated.

The polyethylene (A) of the present invention has a proportion of fractions with a molecular weight of 10,000 or less as measured by gel permeation chromatography of 8 wt % or less, preferably 6 wt % or less, more preferably 4 wt % or less. If this proportion exceeds 8 wt %, heat resistance of the stretched film will be deteriorated, and the heat seal appearance of the laminated film will be deteriorated. This is estimated to be because the molecular chain is relaxed by molecules with low molecular weight in the stretching process, and alignment of polyethylene crystals is insufficient.

The polyethylene (A) of the present invention has a density as measured in accordance with JIS K6922-1 (1997) of from 945 to 980 kg/m$^3$. If the density is less than 945 kg/m$^3$, heat resistance of the stretched polyethylene film for lamination tends to be deteriorated, and a polyethylene having a density higher than 980 kg/m$^3$ is difficult to produce industrially.

Such a polyethylene (A) may be obtained by homopolymerizing ethylene or copolymerizing ethylene and a small amount of an α-olefin. For polymerization, commonly a Ziegler catalyst comprising a solid catalyst component containing magnesium and titanium and an organic aluminum compound, a metallocene catalyst comprising an organic transition metal compound containing a cyclopentadienyl derivative and a compound and/or an organic metal compound which reacts with the organic transition metal compound to form an ionic complex, or a vanadium catalyst, may, for example, be used, and a metallocene catalyst and a vanadium catalyst, with which the proportion of fractions with a molecular weight of 10,000 or less will readily be controlled. For example, a slurry method, a solution method or a gas phase method may be employed. The process for producing the polyethylene (A) is not particularly limited, but is preferably a slurry method or a solution method, by which the proportion of fractions with a molecular weight of 10,000 or less will readily be controlled.

The polyethylene (A) of the present invention preferably contains from 5 to 100 ppm of an organic peroxide or a decomposed product thereof, whereby the stretched polyethylene film has a high peak temperature in an endothermic curve measured by a differential scanning calorimeter, and a stretched laminated film having further improved heat resistance will be obtained. If their content exceeds 100 ppm, the appearance of the stretched polyethylene film may sometimes be difficult to control.

The organic peroxide may, for example, be a dialkyl peroxide such as di-t-butyl peroxide, dicumyl peroxide, t-butyl cumyl peroxide, 2,5-dimethyl-2,5-bis(t-butyl peroxy)hexane, 2,5-dimethyl-2,5-bis(t-butyl peroxy)hexine-3, or α, α'-bis(t-butyl peroxy)diisopropylbenzene, a peroxyester such as 2,5-dimethyl-2,5-bis(benzoylperoxy)hexane, t-hexyl peroxybenzoate, t-butyl peroxy-m-toluylbenzoate, t-butyl peroxybenzoate or bis(t-butylperoxy)isophthalate, or a peroxyketal such as 1,1-bis(t-butyl peroxy)-3,3,5-trimethylcyclohexane, 1,1-bis(t-hexylperoxy)cyclohexane, 1,1-bis(t-hexylperoxy)-3,3,5-trimethylcyclohexane, 1,1-bis(t-butyl peroxy)cyclohexane, 1,1-bis(t-butyl peroxy)cyclododecane, n-butyl-4,4-bis(t-butyl peroxy)valerate. Among them, it is preferred to use a dialkyl peroxide, particularly α, α'-bis(t-butyl peroxy)diisopropylbenzene or 2,5-dimethyl-2,5-bis(t-butyl peroxy)hexine-3.

The polyethylene (A) of the present invention may contain an additive which is commonly used for a polyolefin, such as an antioxidant, a lubricant, a neutralizing agent, an anti-blocking agent, a surfactant or a slipping agent, as the case requires.

To the polyethylene (A) of the present invention, from 0.01 to 10 wt % of an ethylene/α-olefin copolymer (B) of which a fraction with Mn of 100,000 or more obtained by molecular weight fractionation has 0.15 or more long chain branches per 1,000 carbon atoms of the main chain, may be added. In such a case, the proportion of the polyethylene (A) is from 90 to 99.99 wt %. By adding the ethylene/α-olefin copolymer (B) in such a proportion, forming property and transparency of the stretched polyethylene film for lamination will improved.

The ethylene/α-olefin copolymer (B) may be produced by using a metallocene catalyst. The metallocene catalyst contains a metallocene complex, an activating promoter and as the case requires, an organic aluminum compound as constituents, and it is preferred to copolymerize a macromonomer, ethylene and an olefin having from 3 to 6 carbon atoms, simultaneously with synthesis of the macromonomer. A macromonomer is an olefin polymer having a vinyl group at its terminal, and is an ethylene copolymer having a vinyl group at its terminal obtained by copolymerizing ethylene and an olefin having from 3 to 6 carbon atoms.

The stretched polyethylene film for lamination of the present invention has at least one peak in a range of 135° C. or higher in an endothermic curve as measured by differential scanning calorimetry, whereby the stretched polyethylene film for lamination of the present invention has high heat resistance. If the peak in the endothermic curve of the stretched polyethylene film is less than 135° C., heat resistance of a laminated film obtained by subjecting the stretched polyethylene film to lamination tends to be insufficient, and no favorable heat sealing property will be obtained.

The thickness of the stretched polyethylene film for lamination is preferably from 10 μm to 200 μm, more preferably from 12 μm to 100 μm, further preferably from 14 μm to 50 μm. Within such a range, a laminated film having a favorable heat seal strength will be obtained.

The method for producing the stretched film for lamination is preferably rolling, whereby the stretched polyethylene film for lamination will have excellent heat resistance.

Rolling means a forming method of rolling a polyethylene sheet supplied e.g. from a T-die between two or more rollers to form a film having a predetermined thickness. As a rolling method, polish rolling or calendering employed in T die extrusion may suitably be employed. As a calendering apparatus, for example, two serial calender, three serial calender, four serial calender, S calender, reverse L calender, Z calender and oblique Z calender may, for example, be mentioned.

The rolling may be conducted once or may be conducted two or more times, but it is preferred to conduct rolling two or more times, whereby strength and heat resistance of the stretched polyethylene film for lamination will improve.

The temperature of the polyethylene sheet to be subjected to rolling is, in view of heat resistance of the stretched polyethylene film for lamination, preferably from 110° C. to 150° C., more preferably from 115° C. to 140° C., further preferably from 120° C. to 135° C.

By further stretching the polyethylene stretched film for lamination of the present invention in the transverse direction, a biaxially stretched film can be produced. As a method of transverse stretching, a tenter method is preferred.

The polyethylene stretched film for lamination may be subjected to an optional appropriate surface treatment to increase adhesion of a laminated film. As the surface treatment, corona treatment, flame treatment and plasma treatment may, for example, be mentioned.

Further, the polyethylene stretched film for lamination may be subjected to deposition e.g. with aluminum, alumina or silicon dioxide, or may be coated with a gas barrier resin such as polyvinyl alcohol or polyvinylidene chloride or a material having a layered filler dispersed in a gas barrier resin.

By bonding an ethylene polymer film on at least one side of the polyethylene stretched film for lamination of the present invention, a laminated film is obtained.

The thickness of the ethylene polymer film is preferably from 5 μm to 200 μm, more preferably from 10 to 150 μm, further preferably from 20 μm to 120 μm. Within such a range, a laminated film excellent in heat sealing property will be obtained.

The ethylene polymer may be an ethylene homopolymer, or may be a copolymer of ethylene with a monomer copolymerizable with ethylene. The ethylene polymer may, for example, be a high density polyethylene, an ethylene/α-olefin copolymer, a high pressure low density polyethylene, an ethylene/vinyl acetate copolymer, an ethylene/unsaturated carboxylic acid copolymer, an ethylene/unsaturated carboxylate copolymer, an ethylene/carbon monoxide copolymer, or an ethylene/styrene copolymer. Among them, a high pressure low density polyethylene, an ethylene/α-olefin copolymer, an ethylene/vinyl acetate copolymer and an ethylene/acrylate copolymer are preferred, whereby the obtainable laminated film has excellent heat sealing property.

The method for producing a high density polyethylene and an ethylene/α-olefin copolymer is not particularly limited and may, for example, be a high/medium/low pressure ionic polymerization method using a Ziegler-Natta catalyst, a Phillips catalyst or a metallocene catalyst. Such a resin may be selected optionally from among commercial products. For example, Nipolon hard, Nipolon-L, Nipolon-Z, tradenames, are available from Tosoh Corporation. As an α-olefin constituting the ethylene/α-olefin copolymer, propylene, 1-butene, 1-pentene, 1-hexene, 1-heptene, 1-octene, 1-nonene and 1-decene may, for example, be mentioned. As a method for producing a high pressure low density polyethylene, high pressure radical polymerization may, for example, be mentioned. Such a resin may be selected optionally from among commercial products, such as Petrocene, tradename, manufactured by Tosoh Corporation. As a method for producing an ethylene/vinyl acetate copolymer, a known polymerization method such as high pressure radical polymerization, solution polymerization or emulsion polymerization may, for example, be mentioned. Such a resin may be selected optionally from among commercial products, and as an ethylene/vinyl acetate copolymer, Ultracene, tradename, is available from Tosoh Corporation.

The density of the ethylene polymer is preferably from 880 kg/m$^3$ to 940 kg/m$^3$, more preferably from 890 kg/m$^3$ to 930 kg/m$^3$, most preferably from 895 kg/m$^3$ to 925 kg/m$^3$. Within such a range, the obtainable laminated film has an excellent heat seal appearance. The density of the ethylene polymer is measured in accordance with JIS K6922-1 (1997).

The melt flow rate of the ethylene polymer is preferably from 0.1 to 30 g/10 min, more preferably from 0.5 to 25 g/10 min, further preferably from 1 to 20 g/10 min. The ethylene polymer having a melt flow rate within such a range is advantageous in excellent forming property when the ethylene polymer film is produced.

The melting point of the ethylene polymer is preferably from 80° C. to 130° C., more preferably from 80° C. to 120° C. The melting point of the ethylene polymer may be measured by a measuring apparatus DSC6220 (manufactured by Seiko Instruments Inc.) by increasing the temperature at a temperature-increasing rate of 10° C./min and at a temperature-decreasing rate of 10° C./min from a starting temperature of 30° C. to 230° C.

The ethylene polymer film may further contain an optional appropriate additive as the case requires. Further, the ethylene polymer film may contain an adhesion-imparting agent. By forming the ethylene polymer film containing an adhesion-imparting agent, a laminated film having excellent heat sealing property will be obtained.

The adhesion-imparting agent may, for example, be a petroleum resin such as an aliphatic petroleum resin, an aliphatic hydrogenated petroleum resin, an aromatic petroleum resin, an aromatic hydrogenated petroleum resin, an alicyclic petroleum resin, an alicyclic hydrogenated petroleum resin or a copolymer hydrogenated petroleum resin, a chroman resin, a styrene resin, a rosin resin which is a natural resin-based adhesion-imparting agent, a methyl ester resin, a glycerin ester resin, a pentaerythritol ester resin or a terpene resin, or a modified product thereof. Among such adhesion-imparting agents, at least one adhesion-imparting agent selected from the group consisting of a petroleum resin, a terpene resin and a rosin resin is preferred, with a view to improving adhesion.

The adhesion-imparting agent has a softening point as measured by ring-and-ball method of preferably 90° C. or more and 140° C. or less, more preferably 100° C. or more and 135° C. or less, further preferably 105° C. or more and 130° C. or less. In a case where the softening point is within the above range, blocking of the film after forming tends to be small, and the adhesive strength will be favorably maintained at low temperature.

As the adhesion-imparting agent, a commercial product may be used. specifically, as the petroleum resin, ARKON P100, ARKON P125, ARKON P140, ARKON M90, ARKON M115 and ARKON M135, tradenames, manufactured by ARAKAWA CHEMICAL INDUSTRIES, LTD., I-MARV S110 and I-MARV P125, tradenames, manufactured by Idemitsu Kosan Co., Ltd., T-REZ RC115 and T-REZ HA125, tradenames, manufactured by JXTG NIPPON OIL & ENERGY CORPORATION may, for example, be mentioned. As the rosin resin, PINECRYSTAL KE-311 tradename, manufactured by ARAKAWA CHEMICAL INDUSTRIES, LTD. may, for example, be mentioned. As the terpene resin, YS resin PX1150 and YS resin PX1150N, tradenames, manufactured by YASUHARA CHEMICAL CO., LTD. may, for example, be mentioned.

The content of the adhesion-imparting agent is, per 100 parts by weight of the ethylene polymer constituting the ethylene polymer film, preferably from 1 part by weight to 30 parts by weight, more preferably from 5 parts by weight to 40 parts by weight. Within such a range, a laminated film excellent in heat sealing property will be obtained.

As other additive, for example, an additive commonly used for a polyolefin, such as an antioxidant, a lubricant, a neutralizing agent, an anti-blocking agent, a surfactant or a slipping agent, and a thermoplastic resin such as other polyolefin may be mentioned.

The laminated film may be produced by bonding the ethylene polymer film on at least one side surface of the stretched polyethylene film for lamination of the present invention, or on an adhesive layer surface of the stretched polyethylene film for lamination having an adhesive layer such as an anchor coat layer provided. Such a method may, for example, be an extrusion lamination method such as single lamination, tandem lamination, sandwich lamination or co-extrusion lamination, or a dry lamination method. The processing temperature of the ethylene polymer in the extrusion lamination method is preferably within a range of from 200° C. to 350° C., and the surface temperature of a cooling roller is preferably within a range of from 10° C. to 50° C. In a case where the film is subjected to extrusion lamination, an ozone gas may be blown so as to obtain favorable adhesion. In such a case, the temperature of the ethylene polymer extruded from the die is preferably 200° C. or higher. Further, the amount of the ozone gas to be blown is preferably 0.5 mg or more per 1 $m^2$ of the film composed of a resin composition for extrusion lamination of the present invention, extruded from the die.

The adhesive layer is not particularly limited, and for example, a polyurethane adhesive, an isocyanate adhesive, a polyethyleneimine adhesive, a polybutadiene adhesive, an acrylic adhesive and an epoxy adhesive may be mentioned. The polyurethane adhesive and the isocyanate adhesive are preferably an adhesive constituted by at least one polyol component having two or more hydroxy groups in its molecule, and at least one polyisocyanate component and/or diisocyanate having two or more isocyanate groups in its molecule. The polyol component may optionally be selected from a polyester polyol, a polyether polyol, an acrylic polyol and a polyolefin polyol. The diisocyanate may, for example, be an aromatic diisocyanate such as 4,4'-, 2,4'-and 2,2'-diisocyanate diphenylmethane, 1,5-diisocyanatenaphthalene, 4,4'-diisocyanate dicyclohexylmethane, 1,4-diisocyanate benzene and/or 2,4-or 2,6-diisocyanate toluene, an aliphatic or alicyclic diisocyanate such as 1,6-diisocyanate hexane, 1,10-diisocyanate decane, 1,3-diisocyanate cyclopentane, 1,4-diisocyanate cyclohexane, or 1-isocyanate-3,3,5-trimethyl-3 or -5-isocyanatemethane cyclohexane. The polyisocyanate component may be produced from such a diisocyanate monomer. Such an anchor coating agent may be optionally selected from among commercial products, and as the polyurethane adhesive, Nippolan 3228, tradename, is available from Tosoh Corporation, and as the polyethyleneimine adhesive, Toyobine, tradename, is available from Tosoh Corporation.

The thickness of the adhesive layer is, in the case of extrusion lamination, preferably from 0.01 μm to 2.0 μm, more preferably from 0.01 to 1 μm, most preferably from 0.01 to 0.5 μm, and in the case of dry lamination, preferably from 0.5 μm to 5.0 μm, more preferably from 0.8 to 3 μm, most preferably from 0.8 to 2 μm. Within such a range, a laminated film excellent in recyclability and adhesion will be obtained.

The most part of the laminated film of the present invention is constituted by a polyethylene material, and thus the laminated film is excellent in recyclability. As a recycle method, material recycling of melt-kneading the laminated film to obtain pellets, and chemical cycling of thermally decomposing the laminated film to obtain a low molecular weight hydrocarbon may be mentioned, and material recycling is preferred in view of low cost and low energy. That is, pellets obtained by recycle are constituted by the laminated film of the present invention. The pellets may sometimes be referred to as recycled polyethylene pellets of the present invention.

The apparatus for melt-kneading the stretched polyethylene film for lamination is not particularly limited so long as the stretched polyethylene film for lamination can uniformly be dispersed, and a conventionally employed kneading apparatus for a resin may be used. For example, a kneading apparatus such as a single screw extruder, a twin screw extruder, a multi screw extruder, a Banbury mixer, a pressure kneader, a revolving roller or an internal mixer may be used to obtain recycled pellets. Among them, a twin screw extruder is more preferred in view of more excellent dispersibility and continuous productivity.

In the case of kneading by a twin screw extruder, the number of revolutions of the screw is not particularly limited and is preferably 50 rpm or more and 3,000 rpm or less, more preferably 300 rpm or more and 3,000 rpm or less. When the number of revolutions of the screw is 50 rpm or more, the mixed components will be well dispersed, and the obtainable resin will have excellent physical properties, and when the number of revolutions of the screw is 3,000 rpm or less, deterioration of the resin by excessive shear heating will not occur, and the obtainable resin will be excellent in physical properties.

In a case where an extruder is used in the kneading step, a resin composition kneaded by an extruder, preferably a resin composition kneaded under high speed shearing conditions of from 50 rpm or more and 3,000 rpm or less, may be used as a material. Further, a product obtained by extrusion by an extruder may be used as it is as a material.

The recycled polyethylene pellets of the present invention may contain, within a range not to impair the effects of the present invention, an antistatic agent, a photo stabilizer, an ultraviolet absorbing agent, a nucleating agent, a lubricant, an antioxidant, an anti-blocking agent, a fluidity-improving agent, a mold release agent, a frame retardant, a coloring agent, an inorganic neutralizing agent, a hydrochloric acid absorbing agent, a filler, a conductive agent, a chain-elongation agent or a hydrolysis-preventing agent.

EXAMPLES

Now, the present invention will be described in further detail with reference to Examples. However, it should be understood that the present invention is by no means restricted to such specific Examples. Part(s) and % are weight basis unless otherwise specified. The evaluation methods in Examples and Comparative Examples are as follows.

Differential Scanning Calorimetry

Using a differential scanning calorimeter (DSC) (manufactured by SII NanoTechnology Inc., tradename: DSC6220), the temperature was increased from 0° C. at a temperature-increasing rate of 10° C./min to 230° C. (1st scanning), and the endothermic peak in the 1st scanning was measured. The amount of sample of the stretched polyethylene film for lamination was 6 mg.

Melt mass flow rate

Measured by using a melt indexer (manufactured by Takara Kogyo K. K.) in accordance with JIS K6924-1 (190° C., under a load of 2,160 g).

Density

Measured in accordance with JIS K6922-1 (1997).

Molecular Weight

The molecular weight was measured by using a GPC apparatus (manufactured by Tosoh Corporation, HLC-8121GPC/HT, tradename) and a column (manufactured by Tosoh Corporation, TSKgel GMHhr-H(20)HT, tradename) at a column temperature of 140° C. using as an eluant 1,2,4-trichlorobenzene. The measurement sample was prepared to a concentration of 1.0 mg/ml, and 0.3 ml was injected. The analytical curve of the molecular weight was calibrated by using a polystyrene sample having a known molecular weight. As a result of measurement, from the obtained chromatogram, the weight average molecular weight Mw and a proportion of fractions with a molecular weight of 10,000 or less, were calculated.

Long Chain Branch

The number of long chain branches per 1,000 carbon atoms in the polymer was calculated from a carbon nuclear magnetic resonance (13C-NMR) spectrum of a polymer by carbon nuclear magnetic resonance (13C-NMR) using a nuclear magnetic resonance apparatus AVANCE600 manufactured by Bruker, in accordance with the following calculation method. The measurement temperature was set at 130° C., and the solvent was a mixed liquid of 1,2-dichlorobenzene/1,2-dichlorobenzene-d4=75/25 (volume ratio).

Method for Calculating Number of long Chain Branch (LCB)

In an NMR spectrum with Gaussian window function, taking the sum of peak areas of all peaks having a peak top at from 5 to 50 ppm as 1,000, the number of long chain branches (the number of branches having 7 or more carbon atoms) was obtained from peak areas of peaks derived from methine carbon to which branches having 7 or more carbon atoms are bonded. Under the measurement conditions, the number of long chain branches (the number of branches having 7 or more carbon atoms) was obtained from peak areas of peaks having a peak top in the vicinity of from 38.22 to 38.27 ppm. The peak area of the peak was defined as an area of a signal from the chemical shift at a valley with an adjacent peak on the high magnetic field side to the chemical shift at a valley with an adjacent peak on the low magnetic field side. Under the measurement conditions, in measurement of the ethylene/1-octene copolymer, the peak top of a peak derived from the methine carbon to which the hexyl branch is bonded was at 38.21 ppm.

Heat seal Appearance

The laminated film obtained in Example was subjected to heat sealing using Heat Seal Tester TP-701B (manufactured by TESTER SANGYO CO., LTD.) at a set temperature of 130° C., double-sided heating, under an air pressure of 0.3 MPa for a sealing time of 8 seconds, followed by air-cooling, whereupon the appearance of the laminated film was evaluated. A case where the laminated film significantly shrank and had deteriorated appearance was rated X, and a case where the laminated film less shrank and had favorable appearance was rated ○.

Recyclability

The stretched polyethylene film for lamination and the ethylene polymer film obtained in each Example were ground, and melt-kneaded by a twin screw extruder (manufactured by TECHNOVEL CORPORATION, ULTnano25TW, tradename) with a screw diameter of 25 mm, at a resin temperature of 160° C. at a number of revolutions of the screw of 300 rpm to obtain strands. Smoothness of the obtained strands was evaluated, and when the strands were smooth, the films were judged to be excellent in recyclability.

Example 1

[Preparation of Organically Modified Clay]
Into a 1 liter flask, 300 ml of industrial alcohol (EKINEN F-3, tradename, manufactured by Japan Alcohol Tradeing CO., LTD.) and 300 ml of distilled water were put, 15.0 g of concentrated hydrochloric acid and 63.7 g (120 mmol) of dioleylmethylamine (($C_{18}H_{35}$)$_2$($CH_3$)N, manufactured by LION SPECIALTY CHEMICAL CO., LTD., LIPOMIN M20, tradename) were added and heated to 45° C. 100 g of synthetic hectorite (manufactured by BYK, LAPONITE RD, tradename) was dispersed, followed by heating to 60° C., and by stirring for 1 hour while the temperature of 60° C. was maintained. The obtained slurry was subjected to filtration, and the collected solid was washed twice with 600 ml of water of 60° C. and dried in a drier at 85° C. for 12 hours to obtain 130 g of organically modified clay. The organically modified clay was ground by a jet mill to a median diameter of 15 μm.
[Preparation of Polymerization Catalyst]
To a 300 mL flask equipped with a thermometer and a reflux tube, the interior of which was replaced with nitrogen, 25.0 g of the organically modified clay obtained in the above [Preparation of organically modified clay] and 108 mL of hexane were put, and then 0.392 g (1 mmol) of bis(indenyl)

zirconium dichloride and 142 mL of 20% triisobutylaluminum were added, followed by stirring at 60° C. for 3 hours. After cooling to room temperature, the supernatant liquid was withdrawn, and the precipitate was washed twice with 220 mL of hexane, and then 220 ml of hexane was added to obtain a catalyst suspension (solid content by weight: 12.0 wt %).

[Production of Polyethylene Powder (A1)]

Into a 2 L autoclave, 1.2 L of hexane, 1.0 mL of 20% triisobutylaluminum and 200 mg (corresponding to 24 mg of solid content) of the catalyst suspension obtained in the above [Preparation of polymerization catalyst] were added, followed by heating to 85° C., and an ethylene/hydrogen gas mixture was continuously supplied to a partial pressure of 0.90 MPa (concentration of hydrogen in ethylene/hydrogen gas mixture: 450 ppm). 90 minutes later, the autoclave was depressurized, and the obtained slurry was subjected to filtration and the collected solid was dried to obtain a polyethylene powder (A1).

The obtained polyethylene powder (A1) had a weight average molecular weight of 111,000, a proportion of fractions with molecular weight of 10,000 or less of 3.4% and a density of 950 kg/m$^3$.

The obtained polyethylene powder (A1) was melt-kneaded using a twin screw extruder (manufactured by TECHNOVEL CORPORATION, ULTnano25TW, tradename) having a screw diameter of 25 mm at a resin temperature of 160° C. at a number of revolutions of the screw of 300 rpm to obtain polyethylene pellets (A1).

The polyethylene pellets (A1) were subjected to compression molding using a compression molding machine AWFA.50 (manufactured by Shinto Metal Industries, Ltd.) and a mold of 150 mm×150 mm×0.2 mm, at a heating temperature of 200° C. at a cooling temperature of 25° C., for primary pressurization of 0.1 MPa×3 minutes, secondary pressurization of 10 MPa×3 minutes and cooling pressurization of 10 MPa×3 minutes to prepare a sheet having a thickness of 0.2 mm.

The obtained sheet was heated by the above compression molding machine at a temperature of 140° C. under a pressure of 0.1 MPa for 3 minutes, and then made to pass 10 times through 8 inch test roller machine (manufactured by KANSAI ROLL Co., Ltd.) set at a roller temperature of 130° C. at a number of revolutions of 20 rpm with a roller clearance of 0.1 mm, as a roller machine, to obtain a stretched polyethylene film for lamination. Using the stretched polyethylene film for lamination, differential scanning calorimetry was conducted.

The stretched polyethylene film for lamination, and as an ethylene polymer film, an ethylene/1-hexene copolymer film having a thickness of 50 μm, obtained by film forming using an ethylene/1-hexene copolymer (manufactured by Tosoh Corporation, "Nipolon ZZF230-1", tradename, MFR: 2 g/10 min, density: 920 kg/m$^3$) by an inflation molding machine (manufactured by PLACO Co., Ltd.), were bonded via a urethane adhesive (a mixture of "TAKELAC A3210" and "TAKENATE A3072", tradenames, manufactured by Mitsui Chemicals, Inc.) to obtain a laminated film. Using the obtained laminated film, the heat seal appearance was evaluated. The evaluation results are shown in Table 1.

Further, using 20 wt % of the stretched polyethylene film for lamination and 80 wt % of the ethylene/1-hexene copolymer film, recyclability was evaluated.

Example 2

In the same manner as in Example 1 except that 50 ppm of an organic peroxide (PERHEXA C, manufactured by NOF Corporation) was added to the polyethylene powder (A1), to obtain polyethylene pellets (A2). Using the polyethylene pellets (A2), in the same manner as in Example 1, a stretched polyethylene film for lamination and a laminated film were obtained. The evaluation results are shown in Table 1.

Example 3

In the same manner as in Example 2 except that the temperature of the sheet to be made to pass through the 8 inch test roller machine was 120° C., a stretched polyethylene film for lamination and a laminated film were obtained. The evaluation results are shown in Table 1.

Example 4

[Preparation of Modified clay]

Into a 1 L flask, 300 mL of industrial alcohol (EKINEN F-3, tradename, manufactured by Japan Alcohol Tradeing CO., LTD.) and 300 mL of distilled water were put, and 18.8 g of concentrated hydrochloric acid and 49.1 g (120 mmol) of dimethylhexacosilamine (Me2N(C26H53), synthesized by a conventional method) were added, followed by heating to 45° C. 100 g of synthetic hectorite (manufactured by Rockwood Additives, Laponite RDS, tradename) was dispersed, followed by heating to 60° C., and by stirring for 1 hour while the temperature of 60° C. was maintained. The obtained slurry was subjected to filtration, and the collected solid was washed twice with 600 ml of water of 60° C. and dried in a dryer at 85° C. for 12 hours to obtain 140 g of organically modified clay. The organically modified clay was ground by a jet mill to a median diameter of 14 μm.

[Preparation of Polymerization Catalyst]

To a 300 mL flask equipped with a thermometer and a reflux tube, the interior of which was replaced with nitrogen, 25.0 g of the organically modified clay obtained in the above [Preparation of organically modified clay] and 108 mL of hexane were put, and then 0.4406 g of dimethylsilylene (cyclopentadienyl)(2,4,7-trimethyl-1-indenyl)zirconium dichloride and 142 mL of 20% triisobutylaluminum were added, followed by stirring at 60° C. for 3 hours. After cooling to 45° C., the supernatant liquid was withdrawn, and the precipitate was washed five times with 200 ml of hexane, and then 200 ml of hexane was added to obtain a catalyst suspension (solid content by weight: 12.0 wt %).

[Production of Ethylene/α-olefin Copolymer (B)]

Into a 2 L autoclave, 1.2 L of hexane, 1.0 mL of 20% triisobutylaluminum and 75 mg (corresponding to 9.0 mg of solid content) of the catalyst suspension obtained in [Preparation of polymerization catalyst] were added, followed by heating to 80° C., 8.3 g of 1-butene was added, and an ethylene/hydrogen gas mixture was continuously supplied to a partial pressure of 0.85 MPa (concentration of hydrogen in ethylene/hydrogen gas mixture: 850 ppm). 90 minutes later, the autoclave was depressurized, the obtained slurry was subjected to filtration, and the collected solid was dried to obtain an ethylene/1-butene copolymer powder. The density of the obtained polymer was 941 kg/m$^3$. The number of long chain branches was 0.30 per 1,000 carbon atoms of the main chain.

A stretched polyethylene film for lamination and a laminated film were obtained in the same manner as in Example 2 except that polyethylene powder (A3) comprising 95 wt % of polyethylene powder (A) and 5 wt % of an ethylene/1-butene copolymer powder as the ethylene/α-olefin copolymer(B), was used instead of the polyethylene powder (A). The evaluation results are shown in Table 1.

Comparative Example 1

A stretched polyethylene film for lamination and a laminated film were obtained in the same manner as in Example 1 except that polyethylene pellets (A4) (manufactured by Tosoh Corporation, Nipolon hard 5700, density 954 kg/m³) having a weight average molecular weight of 122,000 and a proportion of fractions with a molecular weight of 10,000 or less of 10.2% were used instead of the polyethylene pellets (A1). The evaluation results are shown in Table 1. The stretched polyethylene film for lamination was inferior in heat resistance.

Comparative Example 2

A stretched polyethylene film for lamination and a laminated film were obtained in the same manner as in Example 1 except that polyethylene pellets (A5) (manufactured by Tosoh Corporation, Nipolon hard 7300A, density 952 kg/m³) having a weight average molecular weight of 250,000 and a proportion of fractions with a molecular weight of 10,000 or less of 26.1% were used instead of the polyethylene pellets (A). The evaluation results are shown in Table 1. The stretched polyethylene film for lamination was inferior in heat resistance.

Comparative Example 3

A stretched polyethylene film for lamination and a laminated film were obtained in the same manner as in Example 1 except that ultrahigh molecular weight polyethylene powder (A6) having a weight average molecular weight of 2,000,000, a proportion of fractions with a molecular weight of 10,000 or less of 0% and a density of 938 kg/m³ was used instead of the polyethylene powder (A1). The evaluation results are shown in Table 1. The laminated film was inferior in recyclability.

Comparative Example 4

A stretched polyethylene film for lamination and a laminated film were obtained in the same manner as in Example 1 except that a biaxial stretching apparatus (manufactured by Toyo Seiki Seisaku-sho, Ltd. EX10-B, tradename) was used instead of the roller machine, and stretching by a tenter was conducted at 130° C. so that the draw ratio would be 4 times. The evaluation results are shown in Table 1. The stretched polyethylene film for lamination was inferior in heat resistance.

The present invention has been described in detail with reference to specific embodiments, but it is obvious for the person skilled in the art that various changes and modifications are possible without departing from the intension and the scope of the present invention.

The entire disclosure of Japanese Patent Application No. 2021-042232 filed on Mar. 16, 2021 including specification, claims and summary is incorporated herein by reference in its entirety.

The invention claimed is:

1. A stretched polyethylene film for lamination, which comprises a polyethylene (A) having a weight average molecular weight (Mw) as measured by gel permeation chromatography of from 70,000 to 250,000, a proportion of fractions with a molecular weight of 10,000 or less of 8 wt % or less, and a density as measured in accordance with JIS K6922-1 (1997) of from 945 to 980 kg/m³, and has at least one peak in a range of 135° C. or higher in an endothermic curve as measured by a differential scanning calorimetry.

2. The polyethylene film for lamination according to claim 1, wherein the polyethylene (A) contains from 5 to 100 ppm of an organic peroxide or a decomposed product thereof.

3. The stretched polyethylene film for lamination according to claim 1, which is formed of a polyethylene composition comprising from 90 to 99.99 wt % of the polyethylene (A) and from 0.01 to 10 wt % of an ethylene/α-olefin copolymer (B) of which a fraction with Mn of 100,000 or more obtained by molecular weight fractionation has 0.15 or more long chain branches per 1,000 carbon atoms of the main chain.

4. A laminated film comprising the stretched polyethylene film for lamination as defined in claim 1, and an ethylene polymer film having a density of from 880 to 940 kg/m³ disposed on at least one side of the stretched polyethylene film for lamination.

5. A method for producing a biaxially stretched film, which comprises stretching the stretched polyethylene film for lamination as defined in claim 1 further in the transverse direction.

6. Recycled polyethylene pellets constituted by the stretched polyethylene film for lamination as defined in claim 1.

TABLE 1

| | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Polyethylene (A) | Weight average molecular weight | 11.1 | 11.1 | 11.1 | 11.1 | 12.2 | 25.0 | 200 | 11.1 |
| | Proportion of components having molecular weight of 10000 or less (%) | 3.4 | 3.4 | 3.4 | 3.4 | 10.2 | 26.1 | 0 | 3.4 |
| | Density (kg/m³) | 950 | 950 | 950 | 950 | 954 | 952 | 938 | 950 |
| | Blend ratio (wt %) | 100 | 100 | 100 | 95 | 100 | 100 | 100 | 100 |
| Ethylene/α-olefin copolymer (B) | Blend ratio (wt %) | — | — | — | 5 | — | — | — | — |
| Organic peroxide | Amount added (ppm) | — | 50 | 50 | 50 | — | — | — | — |
| Rolling | Sheet temperature (° C.) | 130 | 130 | 120 | 130 | 130 | 130 | 130 | — |
| Stretching by tenter | Stretching temperature (° C.) | — | — | — | — | — | — | — | 130 |
| Stretched polyethylene film | Endothermic peak temperature (° C.) | 140 | 142 | 139 | 143 | 131 | 130 | 138 | 134 |
| Laminated film | Seal appearance (shrinkage) | Nil | Nil | Nil | Nil | Observed | Observed | Nil | Observed |
| Recyclability | Strand appearance | Smooth | Smooth | Smooth | Smooth | Smooth | Slightly coarse | Coarse | Smooth |

7. Recycled polyethylene pellets constituted by the laminated film as defined in claim 4.

* * * * *